UNITED STATES PATENT OFFICE.

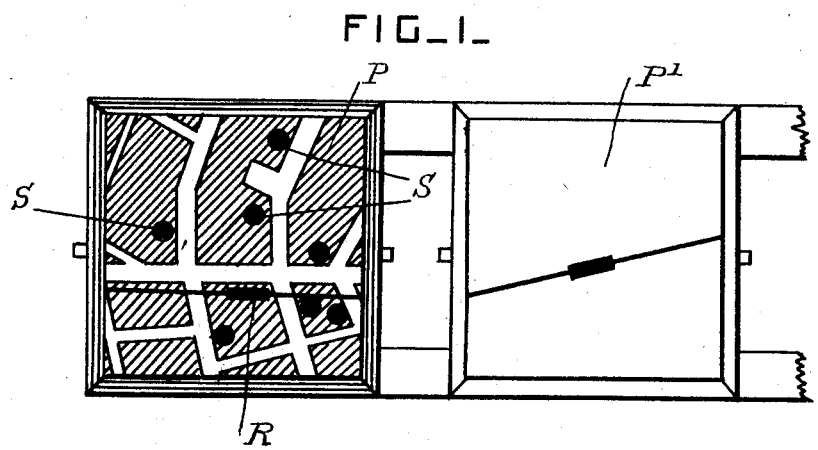
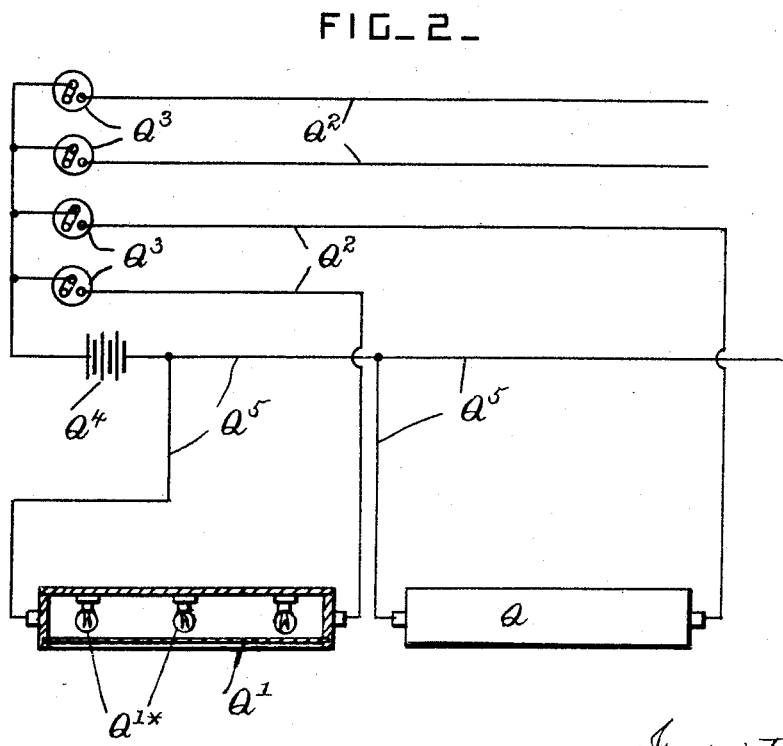

PAUL HENRY WALLER, OF CAMBERWELL, LONDON, ENGLAND.

STATION OR STOPPING-POINT INDICATOR FOR PUBLIC VEHICLES.

1,364,907.     Specification of Letters Patent.     Patented Jan. 11, 1921.

Original application filed November 10, 1919, Serial No. 336,973. Divided and this application filed March 20, 1920. Serial No. 367,382.

*To all whom it may concern:*

Be it known that I, PAUL HENRY WALLER, a citizen of the Republic of France, residing at Camberwell, in the county of London, S. E., England, (whose post-office address is 41 Wilson road, Camberwell, in the county of London, S. E., England,) have invented certain new and useful Improvements in or Relating to Station or Stopping-Point Indicators for Public Vehicles; and I do hereby declare the following to be a full, clear, and exact description of the invention, such as will enable others skilled in the art to which it appertains to make and use the same.

This application is a division of the application for Letters Patent filed by me on November 10, 1919, Serial Number 336,973.

This invention is for improvements in or relating to station or stopping-point indicators for public vehicles and has for its main object to provide means for indicating to the passengers the next stopping point of, say, an electric train, and the street area around such stopping point.

According to this invention there is provided on a railway vehicle a series of map sections constructed as transparencies, each section showing a stopping-point and the streets and important buildings in the immediate neighborhood of such stopping-point, and electrical means for illuminating selectively any one section.

In the accompanying drawings which illustrate one method of carrying out this invention:—

Figure 1 shows diagrammatically a face view of the apparatus, and

Fig. 2 is a diagram showing a simple arrangement of circuits and switches for illuminating the indicators shown in Fig. 1, one of the indicators being shown in cross section.

Along a convenient part of the railway vehicle and within the same, a series of map sections P, $P^1$, etc., is provided, there being as many sections as there are stations at which the vehicle stops. Each section comprises a box or lamp-compartment Q, having at the front a plate $Q^1$ of transparent material on which a map is provided in the form of a transparency. On this map the stopping-point is marked, as shown at R, this being for example shown by a red square, and around the stopping-point the adjacent streets and particular points of interest are indicated by colored marks S, against which are set the names of the places they indicate; the streets also may be named.

Within each box Q lamps $Q^{1*}$ are mounted, and these are connected up by wires $Q^2$ to a series of switches $Q^3$ which may be mounted on a board near the conductor. A battery $Q^4$ may constitute the source of electric supply, and a single return wire $Q^5$ may complete the circuit. Each switch is made to control the lights of one map section, and as soon as the train leaves the station indicated on one map section, the switch of that section is opened by the conductor and that controlling the next section is closed, so that the next stopping-point for the vehicle is indicated and the adjacent streets and places of interest.

If desired, the apparatus may be automatically operated, say through apparatus on the permanent way, so that as the train leaves any one station the map section corresponding to that stopping-point ceases to be illuminated, and that corresponding to the next stopping-point is illuminated instead. The apparatus for such automatic operation, however, constitutes no part of the present invention, and therefore need not be described in this specification.

Obviously the apparatus may be applied to public vehicles other than railway vehicles, for example it may be used to indicate the stopping-points of tramways.

What I claim as my invention and desire to secure by Letters Patent is:—

A station indicator, comprising a series of map sections formed on translucent material and marked to indicate the stopping station of each map section, electric lamps arranged behind the map sections and adapted to illuminate the whole of each of them, and means for regulating the supply of current to each map section, whereby each map section of the series is illuminated at will and indpendently of the others.

In testimony whereof I have affixed my signature in presence of two witnesses.

PAUL HENRY WALLER.

Witnesses:
H. PETER VENN,
ARTHUR JAMES HALL.